Figure 1:
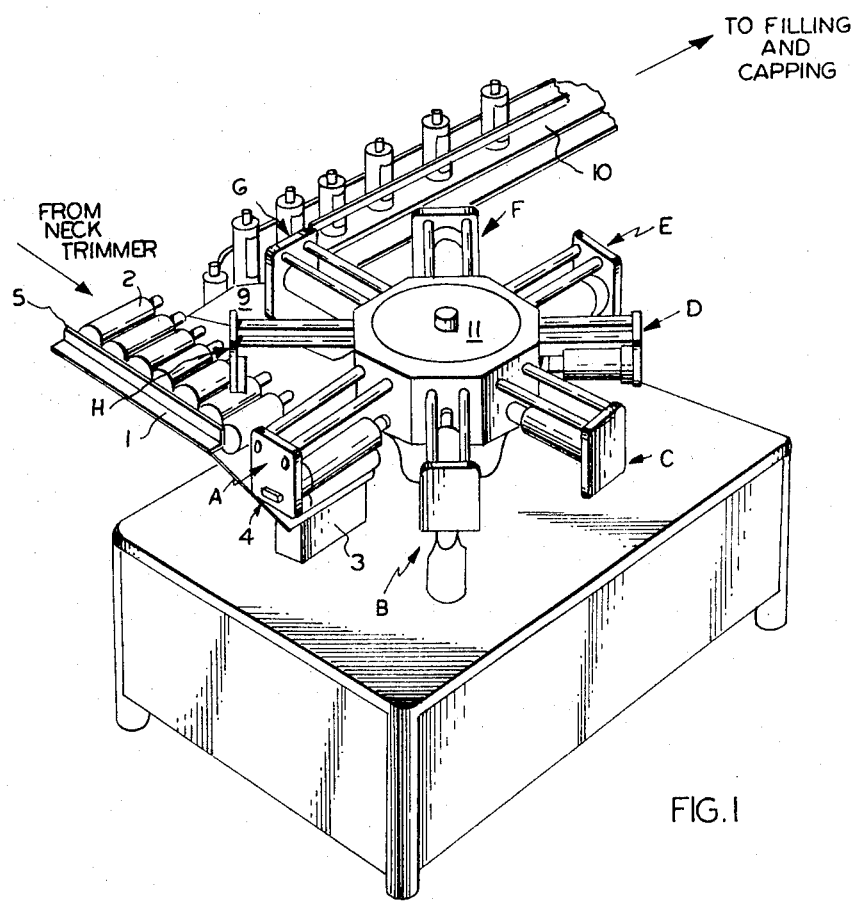

Aug. 23, 1966    J. Y. RESNICK ETAL    3,267,842
DECORATING
Filed April 22, 1964    5 Sheets-Sheet 2

INVENTORS
JOSEPH Y. RESNICK
WILLIAM A. JACOBS
HEINZ THEDORE BRACKLOW

BY *Fisher, Christen, Sabol & Caldwell*
ATTORNEYS

Aug. 23, 1966   J. Y. RESNICK ET AL   3,267,842
DECORATING
Filed April 22, 1964   5 Sheets-Sheet 3
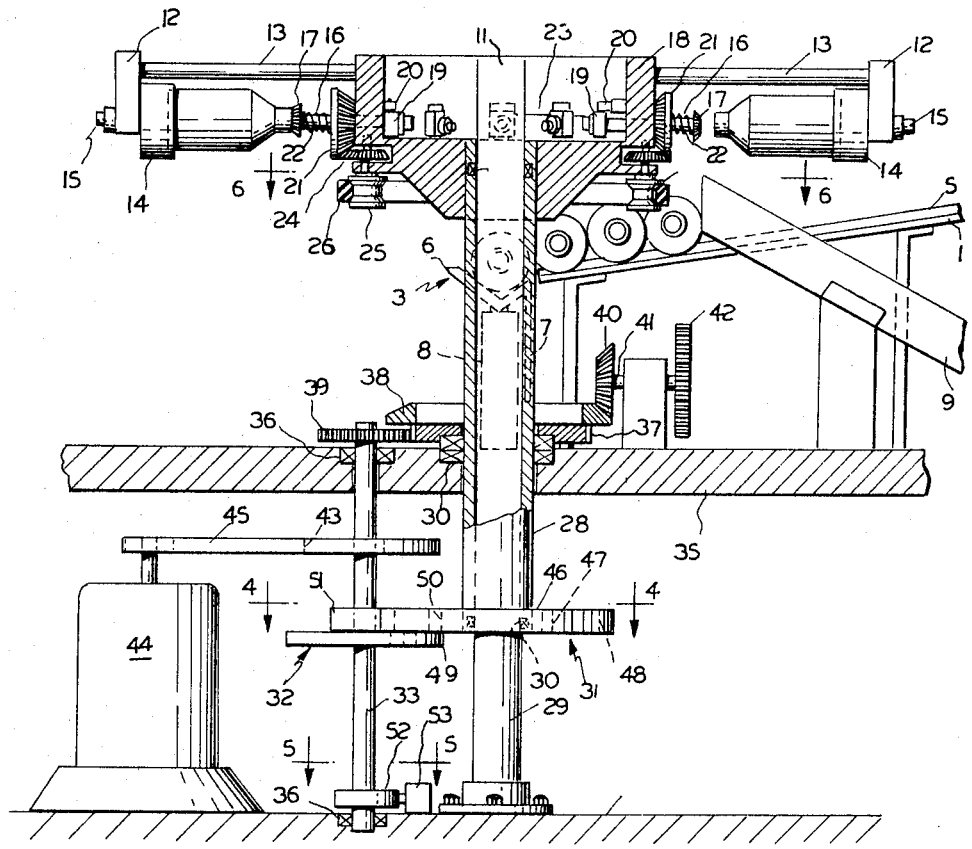
INVENTORS
JOSEPH Y. RESNICK
WILLIAM A. JACOBS
HEINZ THEDORE BRACKLOW
BY Fisher, Christen, Sabol & Caldwell
ATTORNEYS Aug. 23, 1966     J. Y. RESNICK ETAL     3,267,842
DECORATING
Filed April 22, 1964     5 Sheets-Sheet 4
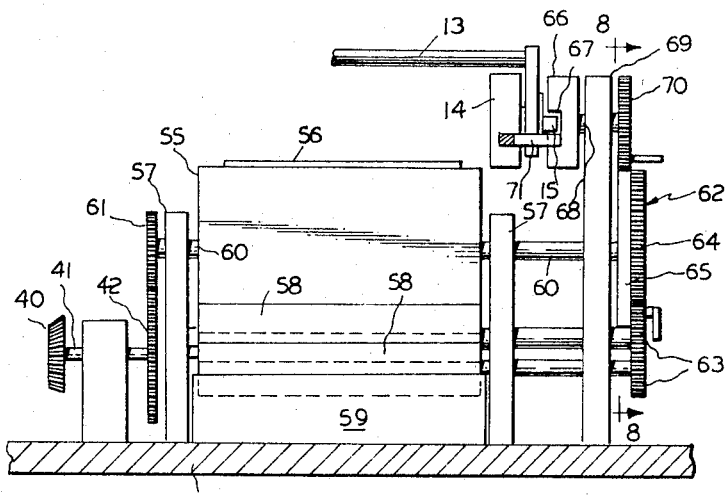
FIG.7
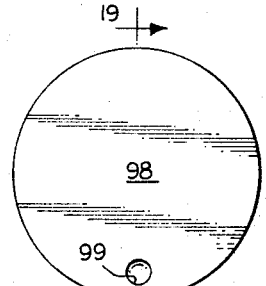
FIG.18
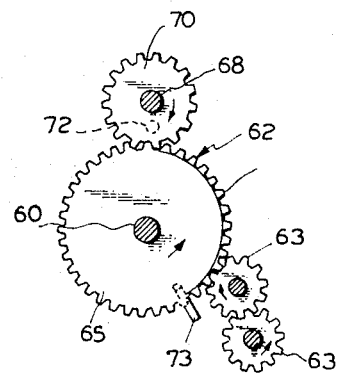
FIG.8
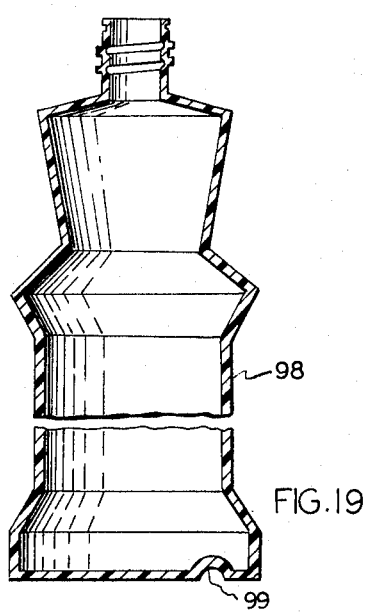
FIG.19
FIG.7A
INVENTORS
JOSEPH Y. RESNICK
WILLIAM A. JACOBS
HEINZ THEDORE BRACKLOW
BY *Fisher, Christen, Sabol & Caldwell*
ATTORNEYS

INVENTORS
JOSEPH Y. RESNICK
WILLIAM A. JACOBS
HEINZ THEDORE BRACKLOW

BY *Fisher, Christen, Sabol & Caldwell*
ATTORNEYS

United States Patent Office 3,267,842
Patented August 23, 1966

3,267,842
DECORATING
Joseph Y. Resnick and William A. Jacobs, Ellenville, and Heinz T. Bracklow, Kerhonkson, N.Y., assignors to Questron America, Inc., Ellenville, N.Y., a corporation of New York
Filed Apr. 22, 1964, Ser. No. 361,640
8 Claims. (Cl. 101—40)

This invention relates to novel machines and methods for decorating articles and, in particular, relates to printing by flexographic means. The invention especially refers to the printing of plastic containers having a cylindrical surface and can be utilized to apply printing and decoration to such containers in one or more different colors.

Heretofore, numerous different means for applying decoration and/or intelligence to plastic containers, such as bottles, have been known. For example, labels carrying the decoration and/or message have been applied by a suitable adhesive. Printing methods, such as, silk screening, dry offset, hot impression, etc., have also been employed but, up until applicants' invention, all previous methods of applying decorations and/or messages to articles, such as plastic containers, have been time-consuming, expensive and, in many cases, not entirely satisfactory.

It is therefore a principal object of applicants' invention to provide methods and machines for applying decorations and/or intelligence to articles, such as plastic containers, in the shortest, simplest and least expensive manner.

Another object is the provision of such methods and machines which are adapted to employ fast drying inks so as to permit a faster and more expeditious processing of articles being so decorated or imprinted, thereby providing extremely high rates of production.

A further object is to provide such methods and machines wherein transparent inks and overprinting can be employed in order to provide the maximum variety of different colors and shades.

A further object is the provision of machines and methods for imprinting plastic containers with decorations and/or messages having a considerably greater depth of color than heretofore possible.

A further object is the provision of machines for printing plastic containers, which machines utilize a plate cylinder of only one diameter.

A further object is the provision of machines and methods for printing plastic bottles which are not cylindrical throughout.

A further object is the provision of a printing machine which is automatically loaded and unloaded.

Another object is the provision of methods and machines for printing plastic bottles within a short time after said bottles are blow molded and are still at a relatively high internal temperature.

Another object is the provision of methods and machines for printing plastic bottles so as to avoid printing over seams and so as to permit overprinting resulting in any desired color or shade.

Another object is the provision of a high-speed method and machine for printing plastic bottles wherein the printed bottle can be delivered directly after printing.

Another object is the provision of machines and methods for printing plastic bottles wherein little or no manual handling of said bottles is necessary.

Figure 2:
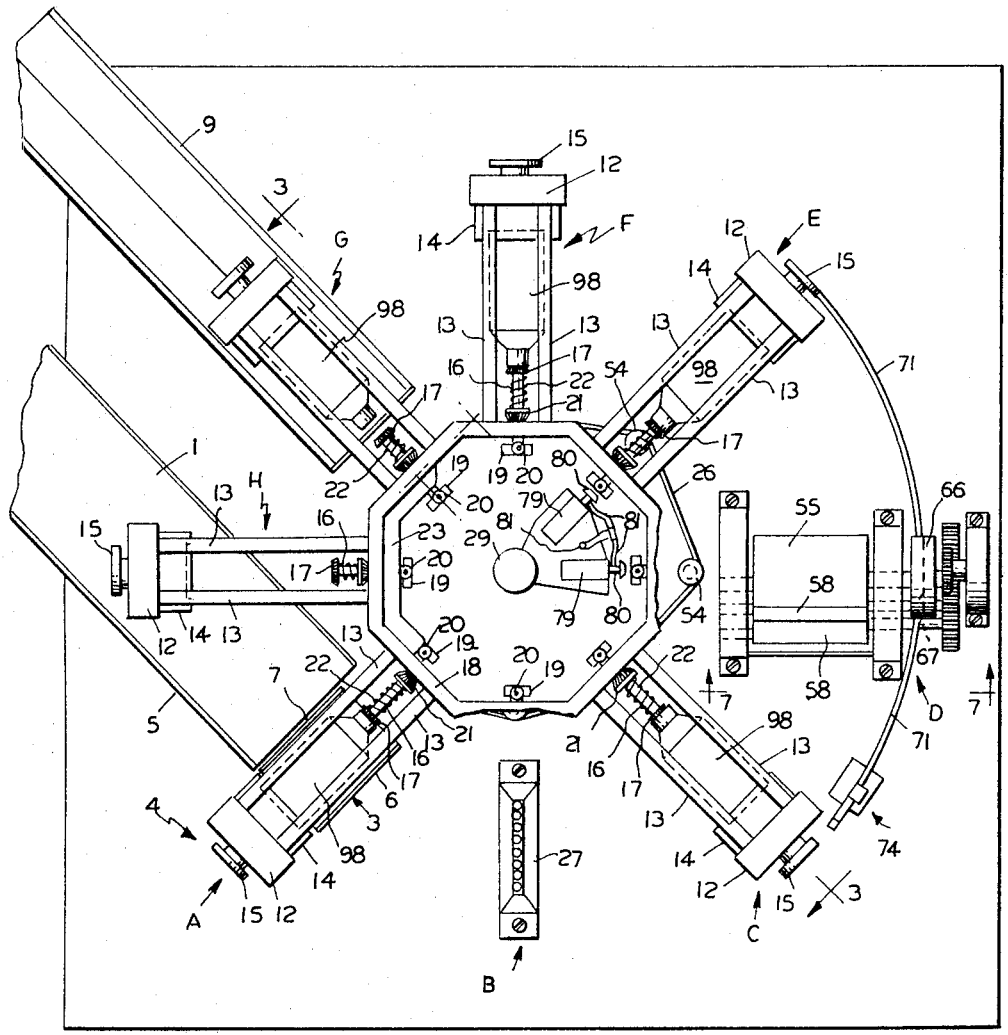
Figure 10:
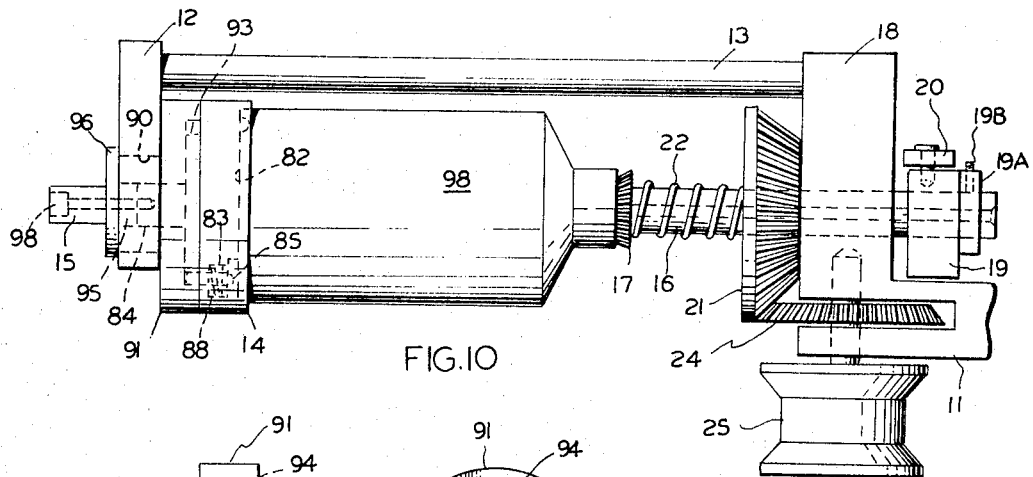
Figure 12:
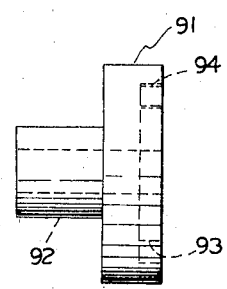
Figure 11:
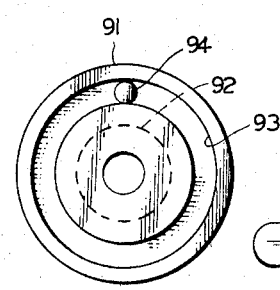
Figure 17:
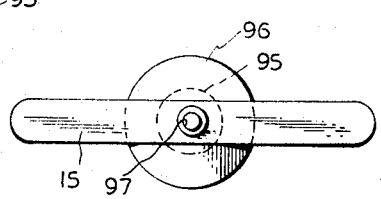
Figure 14:
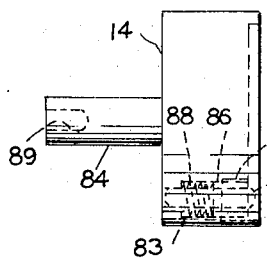
Figure 13:
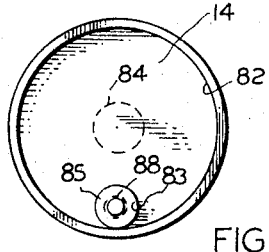
Figure 16:
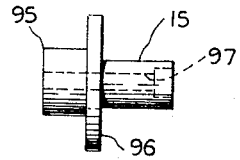
Figure 15:
Figure 9:
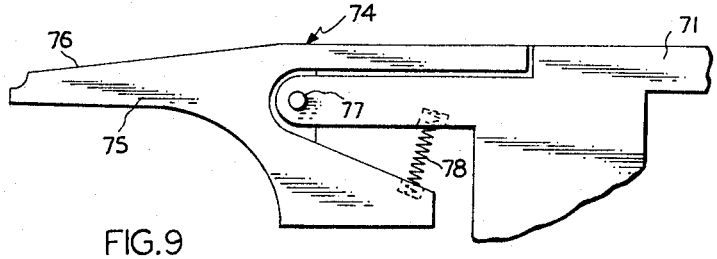

Further objects and advantages will be apparent from the following detailed description taken in conjunction with the appended drawings, in which:

FIG. 1 is a perspective view of a machine of this invention;

FIG. 2 is a plan view of a machine under this invention;
FIG. 3 is a sectional view on line 3—3 of FIG. 2;
FIG. 4 is a sectional view on line 4—4 of FIG. 3;
FIG. 5 is a sectional view on line 5—5 of FIG. 3;
FIG. 6 is a sectional view on line 6—6 of FIG. 3;
FIG. 7 is a sectional view on line 7—7 of FIG. 2;
FIG. 7A is a sectional view of the printing cylinder;
FIG. 8 is a sectional view on line 8—8 of FIG. 7;
FIG. 9 is a partial elevational view of a mechanism for registering the bottle-receiving and bottle held thereby with the printing roller of the flexographic printer;
FIG. 10 is a side elevational view of the bottle receiving and transporting means;
FIG. 11 is an end elevational view of a component of the registry mechanism of the bottle-receiving and holding means shown in FIG. 10;
FIG. 12 is a side elevational view of the component shown in FIG. 11;
FIG. 13 is an end elevational view of the bottle-engaging means which is also a component of the registry means;
FIG. 14 is a side elevational view of the means shown in FIG. 13;
FIG. 15 is a side elevational view of the registry pin employed in the mechanism shown in FIGS. 10 through 14;
FIG. 16 is a side elevational view of the registry wing employed in the means shown in FIG. 10;
FIG. 17 is an end elevational view of the registry wing shown in FIG. 16;
FIG. 18 is a plan view of the bottom of a typical bottle which can be printed in accordance with this invention; and
FIG. 19 is a sectional view taken on line 19—19 of FIG. 18.

Referring now to FIGS. 1, 2 and 3, there is shown a ramp 1 for delivering bottles 2 from a neck trimmer, to which bottles are fed from a blowing machine, to a feeding mechanism 3 which lifts the bottles, one at a time, up to receiving and holding means 4. The ramp 1 is provided with end guide 5 for guiding the bottles 2 by their bottoms so as to properly situate them on feeding mechanism 3. The feeding mechanism 3, as best shown in FIG. 3, comprises a lift 6 of V-shaped cross-section and having a vertical gate 7 depending from the edge adjacent the ramp 1. The lift 6 is connected to the piston rod of an air cylinder 8.

At the delivery end of the machine, a slide 9 having a V-shaped cross-section is positioned below the receiving and holding means in the delivery station G. The slide 9 is directed towards a conveyor belt 10 onto which the printed bottles drop and are conveyed to subsequent filling and capping operations.

As best shown in FIG. 1, the machine illustrated therein comprises eight receiving and holding means 4 mounted on a turntable 11. There are eight positions shown:

Position A is the feed position wherein blank bottles are fed to the machine;
Position B is the flame treating station wherein the surface of the bottles to be printed are flame treated;
Position C is shown as a cooling station but can also be a printing station, if desired;
Position D is a printing station; and
Positions E and F can also be printing stations;
Position G is the printed bottle delivery station;
Position H is shown as a neutral station so as to permit clearance for the ramp 1.

As best shown in FIGS. 2 and 3, the bottle-receiving and holding means 4 each generally comprises an end plate 12 mounted on the ends of two cantilever beams 13. Rotatably mounted by the end plate is a bottle bottom engaging element 14. Connected to said bottom engaging element 14 and disposed on the opposite side of end plate 12 is registry wing 15. The cantilever beams 13 are mounted on the turntable 11 and also mounted on said turntable between and below said beams is a shaft 16 having a bottle mouth engaging plug 17 mounted on its free end. The shaft 16 passes through the turntable wall 18 and collar 19 is slidably mounted on the inner end thereof. A cam wheel 20 is mounted on collar 19 and a bevel gear 21 is slidably mounted on and keyed to the shaft 16. A coil spring 22 is disposed on shaft 16 and urges the plug 17 and gear 21 away from each other. In positions A through F the coil spring 22 is in its extended condition and cam wheel 20 abuts turntable wall 18. A cam track 23 is mounted on the interior of wall 18 beginning just prior to position G and extending through to just prior to position A. The cam wheel 20 is adapted to ride on cam track 23, thus resulting in depression of coil spring 22 and retraction of plug 17 toward turntable 11. Mounted on turntable 11 are bevel gears 24 which mesh with the respective bevel gears 21. The bevel gears 24 are respectively driveably connected to pulleys 25 mounted on the under side of turntable 11. A belt 26 driveably connects all pulleys 25.

As shown in FIG. 2, a gas burner 27 or other means for producing a flame is mounted at station B.

The turntable 11 is mounted on hollow shaft 28 which is rotatably mounted on stationary shaft 29. Suitable ball bearings 30 are provided to reduce or eliminate friction. A Geneva gear mechanism 31 is mounted on the lower end of hollow shaft 28 and cooperates with the driving part 32 of Geneva mechanism 31 which is driveably mounted on drive shaft 33. The machine is provided with a base 34 and a mounting plate 35 mounted above the base 34. The drive shaft 33 is rotatably supported on the base 34 and rotatably passes through mounting plate 35. Suitable bearings 36 are provided between the shaft 33 and the base 34 and mounting plate 35.

A gear 37, to which a bevel gear 38 is fixed, is rotatably mounted on hollow shaft 28. A drive gear 39 is keyed to the shaft 33 and driveably engages gear 37. Bevel gear 38 driveably engages a second bevel gear 40 which is keyed to shaft 41 mounted above mounting plate 35. The shaft 41 is also keyed to drive gear 42 for the printing mechanism which will be more fully described hereinafter.

A drive pulley 43 is keyed to drive shaft 33. An electric motor 44 is mounted on the base 34 and is driveably connected to drive pulley 43 by means of drive belt 45.

As best shown in FIG. 4, the Geneva gear mechanism 31 comprises a disc 46 keyed to the shaft 28 and formed with radial slots 47 and with concavely curved cutouts 48 between said slots. As shown, there are eight slots 47 and eight cutouts 48. The driving part 32 comprises a disc 49 having a pin 50 extending upwardly therefrom and adapted to enter slots 47 during each rotation of the shaft 33 and thus move the disc 46 forwardly one step. During the time that pin 50 is out of engagement with disc 46, said disc is held from rotation by a circular flange 51 coaxially mounted on the disc 49 and shaft 33. The circular flange 51 enters a cutout 48 to accomplish this. As a result, one complete rotation of the shaft 33 will move the disc 46 counter-clockwise one step or one-eighth of a revolution.

Referring to FIGS. 3 and 5, there is shown a cam 52 keyed to the lower end of shaft 33. Also, microswitch 53 is mounted on base 34 such that cam 52 will actuate said microswitch once during every revolution of shaft 33. The microswitch controls the actuation of air cylinder 8 such that just prior to the halting of turntable 11 in its one-eighth revolution or one step, microswitch 53 is actuated to activate air cylinder 8 to raise the lift 6, thus presenting a bottle ready for pick-up at position A.

In most cases it will be desired to rotate pulleys 25 at a faster rate than the rotation of shaft 33 so as to rotate the bottles at a faster rate, for example, to obtain fast drying or, if desirable, to obtain fast cooling.

FIG. 6 illustrates the arrangement of belt 26 in respect to pulleys 25. One of the pulleys 25 is driveably connected to electric motor M so as to drive all pulleys 25 at a rate faster than the rate of rotation of shaft 33. Two idler pulleys 54 at the printing stations are provided so that the belt 26 does not rotate the bottles at positions D and E or any other printing position. In this respect, the bottles in the printing positions are rotated independently of the pulley and belt system, 25 and 26.

FIGS. 2, 3, 7 and 8 illustrate the flexographic printing apparatus which includes printing roller 55 which carries the flexographic printing plate 56 on its surface rotatably mounted in upright supports 57, ink transfer rolls 58 also rotatably mounted on upright supports 57 and ink reservoir 59. In particular, the printing roller 55 is mounted on shaft 60 which is journaled in upright supports 57 and is keyed to gear 61 at one end thereof. Gear 61 driveably engages with drive gear 42 previously described. At the other end, shaft 60 is keyed to double gear 62. Each of the transfer rolls 58 has its respective shaft connected to gears 63 which driveably intermesh and the uppermost of which driveably intermeshes with the full gear of double gear 62. Double gear 62 comprises a full gear portion 64 as its outer part and a two-thirds gear portion 65 as its inner part. By the term "full gear portion" we mean a conventional gear having teeth around the entire periphery thereof; whereas by the term "two-thirds gear portion" we mean a gear which has teeth around two-thirds of its periphery only. The uppermost gear 63 for uppermost transfer roll 58 engages the full gear portion 64.

A registry rotor 66 formed with a diametrical slot 67 is mounted on a shaft 68 which is journaled in an upright support 69. A gear 70 is keyed to shaft 68 and engages with the teeth of two-thirds gear portion 65. Gear 70 has the same number of teeth as the two-thirds gear portion 65 so that gear 70 makes one complete revolution each time said two-thirds gear portion engages and turns it. This ensures that slot 67 begins and ends in a horizontal position. A guide bar 71, as best shown in FIGS. 2 and 7, guides the registry wing 15 in horizontal disposition into diametrical slot 67 in registry rotor 66. This registers rotor 66 with the bottle bottom engaging element 14 and, consequently, the bottle itself. The rotor 66 is in registry with the two-thirds gear portion 65 such that the part of said portion having no teeth permits removal of a printed bottle from the printing position and permits feeding of a new unprinted bottle to that position. The toothed part of portion 65 drives gear 70 and, consequently, the bottle which is being held in printing position, to register the bottle with the printing plate on roller 55. In this connection, it is to be noted that the printed plate 56 covers only two-thirds of the printing roller 55 and covers that two-thirds corresponding to the toothed part of two-thirds gear portion 65. The printing plate 56 is raised above the roller 55 and those portions of the roller 55 that are not covered by said printing plate provide adequate clearance to permit removal and feeding of bottles to the printing position while the printing roller continuously rotates. It is important to continuously rotate the printing roller 55 in order to prevent drying of ink on the printing plate 56 or transfer rolls 58 by continuously re-wetting said plate and rolls. In this connection, it is desirable to mount a manual clutch between pulley 43 and driving part 32 of the Geneva mechanism (see FIG. 3) such that said clutch can be engaged to rotate driving part 32 or disengaged to stop rotation of said driving part. By this means the printing roller can continue to rotate while the turntable 11 has been stopped so as to make adjustments or repairs as the need therefor arises.

In order to give impetus to gear 70 after the toothless part of portion 65 has passed, there is provided a pin 72 mounted on gear 70 and an arm 73 mounted on and projecting beyond the periphery of portion 65. The arm 73 is mounted at the end of the toothless part and is adapted to contact and push pin 72 as the toothless part ends and the toothed part begins.

In order to bring about reliable positioning of registry wing 15 in horizontal condition, there is provided at the forward end of guide bar 71 an automatic adjusting device 74 which comprises a pivot arm 75 having a sloping forward surface 76 and which is pivoted at 77 on an extension of bar 71. A spring 78 biases pivot arm 75 such that surface 76 is in its uppermost position. If the registry wing 15 is not aligned horizontally it will strike the surface 76 and be guided into horizontal alignment. If the wing 15 hits arm 75 head-on in a jamming attitude the arm 75 is free to pivot downwardly to avoid jamming.

FIGS. 10 through 17 illustrate in detail the bottle-receiving and holding means 4. The shaft 16 is provided with a coaxial bore therethrough to permit the introduction of air into the bottle to expand same, thereby facilitating printing. In this respect, the plug 17 can be made of a relatively soft, resilient material so as to obtain an approximate airtight seal against the mouth of the bottle. For this purpose, referring to FIG. 2, air cylinders 79 having pistons 80 with a coaxial bore connected via tubes 81 to a source of compressed air are mounted on shaft 29 and aligned with shafts 16 in the printing position. Suitable means are provided, e.g., cams and microswitches, operated by rotation of shaft 33, to actuate cylinders 79 to advance and retract pistons 80 and to admit air under pressure through tubes 81.

The bottle bottom engaging member 14, as best shown in FIGS. 13 and 14, is formed with a recess 82 for receiving the bottom of the bottle, a bore 83 extending from the bottom of the recess and a shaft 84. A detent 85 formed with a shoulder 86 is disposed within the bore 83 and retained therein by means of an annular nut 87. A coil spring 88 is disposed within said bore and bears on the shoulder 86 and the bottom of the bore to urge the detent 85 out of said bore into the recess 82 but said detent is retained in said bore by the nut 87 and extends only partly into the recess 82. The detent 85 can be moved against the action of the coil spring to withdraw it from the recess 82 and to extend out the other side of the member 14. The shaft 84 has a threaded recess 89 formed in the end thereof for receiving a screw.

The end plate 12 is formed with a bore 90 therethrough and disposed in said bore and keyed to said end plate is a disc 91 having a hollow shaft 92 projecting from one side thereof. The shaft 92 is adapted to fit within the bore 90 of the end plate 12 and to be keyed to said end plate. On the opposite face of the disc 91 there is formed a circular race or groove 93. A pin 94 is mounted in said groove. The shaft 84 of member 14 is adapted to pass through hollow shaft 92 of the disc 91 so as to be rotatable in said hollow shaft. The registry wing 15 is formed with a short shaft 95, a washer 96 and a central bore 97 for receiving a screw. A screw 98 is disposed within the bore 97 of wing 15 and connects said wing to the shaft 84 of member 14. As a consequence, the wing 15 is fixed to the member 14 so as to rotate therewith and, in particular, is fixed in relation to the detent 85.

As best shown in FIGS. 18 and 19, a bottle 98 is formed with a registry recess 99 in its bottom. When the bottle is disposed between plug 17 and bottom engaging member 14 and plug 17 is advanced towards member 14, the bottom of the bottle enters recess 82. In most cases the detent 85 will not be in register with registry recess 99 since the bottles are lifted into position randomly. However, when the shaft 16 is turned through the drive chain comprising pulley 25, bevel gears 24 and 21, the bottle 98 is caused to turn and, due to frictional forces between the bottom of said bottle and the bottom of recess 82, member 14 also turns. However, when the bottle 98 is urged into the recess 82, the registry recess 99 does not usually match up with detent 85 and, consequently, the bottom of said bottle depresses said detent to extend out the other side of member 14. In doing so, detent 85 enters groove 93 and, when member 14 is turned by frictional contact of the bottle bottom with the bottom of recess 82, the detent 85 travels around in the groove 93 until it meets pin 94, at which point continued rotation of member 14 ceases. After this, bottle 98 continues to rotate in relation to member 14 which remains stationary. This relative rotation continues until detent 85 finds registry recess 92 and enters it, at which time the bottle 98 is perfectly aligned in relation to member 14 and registry wing 15. When detent 85 enters registry recess 99, it moves out of the groove 93 and out of contact with pin 94 thereby permitting member 14 to rotate freely with respect to disc 91. It will be noted that when bottle 98, member 14 and disc 91 are aligned coaxially, the registry recess 99, the detent 85 and the groove 93 with pin 94 are all located at the same radial distance from the common axis of said bottle, element and disc.

In operation, bottles are fed down the ramp 1 from a neck trimmer where waste portion from the preceding blowing operation is removed. As the bottles reach the lift 6, one is disposed thereon, thereby stopping succeeding bottles. When the air cylinder 8 is activated by actuation of microswitch 53, the lift 6 raises to dispose the bottle thereon between plug 17 and member 14 of receiving and holding mechanism 4 at station A. The gate 7 raises with the lift 6 to hold back succeeding bottles on ramp 1. The end guide 5 insures alignment of the bottoms of the bottles along a straight line and proper disposition thereof on the lift 6. The lift 6 is in its uppermost position just prior to the time that receiving and holding means 4 reaches station A. In that instant, the plug 17 is in its retracted position. As it moves into alignment with the mouth of the bottle, the cam wheel 20 leaves cam track 23 and approaches turntable wall 18 under the urging of spring 22. The plug 17 thereby engages the mouth of the bottle and pushes the bottle end-wise until the bottom of the bottle enters recess 82 in member 14. During this time, the shaft 16 and plug 17 are being rotated by motor M which turns pulley 25, bevel gears 24 and 21.

When the bottom of the bottle enters recess 82, the registry recess 99 in said bottom is not usually aligned with detent 85. However, the detent 85 is depressed by the bottom of the bottle and the opposite end of said detent enters the groove 93. By frictional engagement of the bottle bottom with the bottom of recess 82, and rotation of said bottle, the member 14 also rotates until detent 85 traveling in groove 93 contacts and is stopped by pin 94. This halts further rotation of member 14 and the bottle rotates relative thereto until registry recess 99 becomes aligned with detent 85 at which time said detent enters said registry recess and leaves groove 93, thereby freeing member 14 for rotation relative to disc 91 and locking said member to the bottle for concurrent rotation. At this point, the bottle is locked to registry wing 15.

The motor 44 turns drive part 32 of the Geneva mechanism through shaft 33 to cause step-wise rotation of disc 46, i.e., in steps of one-eighth rotation for each revolution of shaft 33. The one-eighth rotation of disc 46 moves receiving and holding means 4 from station A to station B. The bottle being held by said means 4 is rotated and flame treated by a flame emitting from burner 27. The next one-eighth rotation of disc 46 moves means 4 to station C where the surface of the bottle is permitted to cool somewhat. The next one-eighth rotation of disc 46 moves means 4 into station D and, in doing so, pulley 25 disengages from belt 26 thereby ceasing the rotation of the bottle 98 being held by said means. Just after the means 54 leaves station C, the registry wing 15 contacts adjusting device 74 and becomes aligned horizontally, if it is not already so aligned, for travel along guide bar 71 into the slot 67 of registry rotor 66.

The registry wing 15 enters the slot 67 when the gear 70 (see FIGS. 7 and 8) is not being turned by the double gear 62, i.e., while the toothless portion of said double gear is passing by gear 70. When the toothed portion of double gear 62, i.e., the two-thirds gear portion, reaches gear 70 and arm 73 hits pin 72, gear 70 rotates to rotate rotor 66 which, in turn, rotates registry wing 15 thereby rotating the bottle bottom engaging element 14 and the bottle 98. At the same time, the printing plate 56 on the roller 55 contacts and prints the cylindrical outer surface of said bottle. FIG. 7A is an end elevational view of printing roller 55 corresponding to the gear positions shown in FIG. 8. That portion of the surface of roller 55 not covered with printing plate 56 corresponds with the toothless portion of double gear 62 and represents the period within which registry wing 15 is fed into slot 67 and, of course, includes the period in which the previous registry wing travels out of said slot towards station E. As noted above, the printing roller 55 and transfer rolls 58 are continously driven by motor 44 through gears 39, 38, 40 and 42 to maintain the ink on said rolls in moist condition.

The next one-eighth rotation carries the bottle to station E where another printing operation is performed, if desired. The rapid drying properties of the flexographic process permit substantially immediate overprinting. The next one-eighth rotation carries the bottle to station F where a third overprinting process is performed, if desired. The printing procedures in stations E and F can be precisely the same as that performed in station D as described above. The next one-eighth rotation of disc 46 moves the bottle into position over slide 9. Just as receiving and holding means 4 reaches position D, the cam wheel 20 rides onto cam track 23 to retract plug 17 from contact with the mouth of bottle 98 permitting said bottle to fall onto said slide and thereafter slide onto a conveyor belt 10 for conveyance to subsequent filling and capping operations.

The collar 19 is retained on the inner end of shaft 16 by means of lock ring 19A fixed to said shaft by set screw 19B as shown in FIG. 10. The disc 49 of the Geneva mechanism is synchronized with the printing roller 55 so that the pin 50 enters a radial slot 47 and rotates the disc 46 one step only when the toothless part of two-thirds gear portion 65 passes the gear 70. The disc 46 is kept stationary by the circular flange 51 when the printing plate 56 is in contact with the bottle 98, i.e., when the toothed part of two-thirds gear portion 65 engages gear 70. Any clutch employed to connect pulley 43 to driving part 32, i.e., in place of that portion of the shaft 33 connecting said elements as shown in FIG. 3, must be capable of engaging at the same place it is disengaged so as not to upset the synchronization of the turntable 11 and printing roller 55.

What is claimed is:

1. A rotary table type machine for applying decoration to articles having a cylindrical surface, comprising a table rotatable on a vertical axis, a flexographic printer mounted below said table, said printer having a printing plate having a rotatable cylindrical printing face adapted to rotate in printing contact with said cylindrical surface and means for rotating said cylindrical printing face, article receiving means mounted on said table at spaced positions around the periphery thereof for receiving and holding said article, means for rotating said receiving means on an axis parallel to said printing plate to rotate the cylindrical surface of said article held thereby in printing contact with said printing face, first registering means for registering said article in said receiving means and second registering means for registering said receiving means with said printing plate.

2. Machine as claimed in claim 1 wherein said first registering means comprises a pin connected to said article receiving means and adapted to engage a depression in said article.

3. Machine as claimed in claim 2 wherein said second registering means comprising a registry wing rotatably mounted on said article receiving means, means for locking said pin to said registry wing to provide mutual rotation of said registry wing and said article, and a rotor geared to said printing plate, said rotor having a slot adapted to be engaged by said registry wing.

4. Machine as claimed in claim 3 wherein there is also provided means mounted below said table for applying flame to said cylindrical surface prior to printing thereon.

5. Machine as claimed in claim 4 wherein there is additionally provided means for loading articles into said article receiving means.

6. Machine as claimed in claim 5 wherein there is additionally provided means for releasing said article from said receiving means after printing.

7. Machine as claimed in claim 6 wherein there is additionally provided means for applying fluid pressure into said article while printing.

8. Machine as claimed in claim 4 wherein there is provided means for rotating said article while the flame is being applied thereto.

References Cited by the Examiner
UNITED STATES PATENTS

| 2,540,554 | 2/1951 | Shurley | 101—124 |
| 2,553,085 | 5/1951 | Grace | 101—124 X |
| 2,739,531 | 3/1956 | Hagerman | 101—126 |
| 2,882,818 | 4/1959 | Vowles | 101—126 |
| 3,110,247 | 11/1963 | Simpson | 101—38 |
| 3,112,692 | 12/1963 | Cookson | 101—38 |

ROBERT E. PULFREY, *Primary Examiner.*

NATHANIEL A. HUMPHRIES, WILLIAM F. McCARTHY, *Assistant Examiners.*